United States Patent Office 2,760,903
Patented Aug. 28, 1956

2,760,903

USE OF COBALT-CONTAINING YEASTS IN PRODUCTION OF COBALAMINES

David Perlman, Princeton, Richard Donovick, Westfield, and Asger F. Langlykke, Highland Park, N. J., assignors to Olin Mathieson Chemical Corporation, New York, N. Y., a corporation of Virginia No Drawing. Application September 7, 1951, Serial No. 245,649

4 Claims. (Cl. 195—80)

This invention relates to yeast of high organically-bound cobalt content, and a method for their production; and it further includes the use of such yeasts in the fermentation-production of cobalamines (vitamin $B_{12}$ and vitamin $B_{12}$-like compounds), especially in the fermentation-production of cobalamines and antibiotics.

For the sake of simplicity, the term "cobalt yeast," when used hereinafter, generically defines a yeast containing organically-bound cobalt. The term "high-cobalt yeast" refers more specifically to the novel yeasts forming, in part, the inventive concept herein described; such yeasts contain 100 or more and, preferably, about 20,000 or more parts per million of organically-bound cobalt. Also, the term cobalamine is used herein to generically define vitamin $B_{12}$ and the various vitamin $B_{12}$-like factors, as vitamin $B_{12a}$ and vitamin $B_{12b}$. The term cyanocobalamine, as used herein, is reserved for vitamin $B_{12}$ per se.

The high-cobalt yeasts of this invention may be prepared by growing yeasts in successive nutrient media containing, in addition to the usual assimilable sources of carbon and nitrogen, an assimilable cobalt salt, the successive nutrient media containing gradually increasing concentrations of cobalt salt until a yeast containing about 100 or more parts per million of cobalt is obtained. It is interesting to note that this yeast will grow in media containing 100 to 300 gamma/ml. of cobalt, although the original culture would not grow in such media.

As an additional feature of this invention, when high-cobalt yeast is included in the nutrient media of growing cultures of cobalamine-producing microorganisms, production of cobalamines is effected in high yield, without adverse effect on any concurrent production of antibiotics.

Numerous yeasts are available for the production of the high-cobalt yeasts. Examples of such yeasts are *Saccharomyces cerevisiae*, *Candida albicans*, *Candida tropicalis*, *Mycotorula lypolytica*, and *Torula utilis*. The true yeasts (notably *Saccharomyces cerevisae*) are preferred.

The high-cobalt yeasts may be used in the fermentation production of cobalamines by any of the cobalamine-producing microorganisms. Examples of such microorganisms producing cobalamines are *Escherichium coli*, *Flavobacterium devorans*, *Flavobacterium solare*, *Bacillus subtilis*, *Bacillus mesentericus*, and especially actinomycetes, such as *Streptomyces griseous* (with concurrent production of streptomycin), *Strepotmyces fradiae* [Waksman et al., J. Clin. Invest. 28:934–39 (1939)] (with concurrent production of neomycin), *Streptomyces aureofaciens* NRRL 2229 (with concurrent production of aureomycin), *Streptomyces venezuelae* ATCC 10712 (with concurrent production of chloramphenicol) and *Streptomyces rimosus* NRRL 2234 (with concurrent production of terramycin).

The nutrient media used for the preparation of the high-cobalt yeasts contain the usual sources of carbon for energy and nitrogen for growth. A large number of nitrogenous materials are available as nitrogen sources, such as the amino acids, casein, fish meal, soybean meal, meat extracts, liver cake, urea, nitrates and ammonium compounds. Cornsteep liquor, because of the wide variety of both organic and inorganic substances contained therein, has been found to be a valuable addition to fermentation media for this purpose. Some of the utilizable carbon sources are (1) carbohydrates, such as sucrose, glucose, maltose, and mannose, (2) polyhydric alcohols, such as glycerol, (3) fats such as lard oil, soybean oil, linseed oil, cottonseed oil, fancy mutton tallow, tristearin and tripalmitin, and (4) fat acids having at least 14 carbon atoms, such as stearic acid, palmitic acid, oleic acid, linoleic acid and myristic acid. In addition, these nutrient media must contain an assimilable cobalt salt, preferably the nitrate or chloride.

The nutrient media used for the production of cobalamines in accordance with this invention also contain the generally utilized sources of nitrogen and carbon, as exemplified above and, in addition, contain the high-cobalt yeast.

The cobalamine product obtained may be treated with cyanides to enhance the yield of cyanocobalamine. This may be done as illustrated in U. S. Patent 2,530,416. Alternatively, cyanides may be periodically added to the cobalamine-producing culture as described in application Serial No. 245,648, filed September 7, 1951, or nitriles (e. g., acetone cyanhydrin) may be added to the culture as described in application Serial No. 252,806, filed October 23, 1951.

Broadly, the invention includes preparing high-cobalt yeasts, adding the high-cobalt yeast to a cobalamine-producing microorganism in a suitable nutrient medium for the production of cobalamines (and antibiotics) and recovering both the cobalamines (and antibiotics) from the fermentation broth by known methods. For example, where streptomycin is the antibiotic produced, the recovery may be carried out as described in U. S. Patent 2,530,416 or 2,461,922.

The quantity of high-cobalt yeast required to effectively aid in the biosynthesis of cobalamines may be as low as that giving a cobalt concentration of about 0.1 mg./l. of nutrient medium. However, use of larger amounts of cobalt-containing yeast does not adversely affect the process.

By way of illustration, the following specific examples of the hereinbefore described invention are given:

EXAMPLE 1

(a) *Preparation of a culture of high-cobalt yeast*

A medium of the following composition is prepared:

| | | |
|---|---|---|
| Cornsteep liquor | g | 20 |
| Beet molasses | g | 20 |
| $NH_4H_2PO_4$ | g | 1 |
| $Co(NO_3)_2 \cdot 6H_2O$ | mg | 10 |
| Water to make 1 liter. | | |

Then 25 ml. aliquots of this medium are distributed in 500 ml. Erlenmeyer flasks. The flasks are plugged with nonabsorbent cotton and autoclaved. After cooling to room temperature, each flask is inoculated with 0.5 ml. of a suspension of the growth, on agar slants, of *Saccharomyces cerevisiae* (National Yeast Co.). The contents of each flask are then incubated for 24 hours on a reciprocating shaker, to produce a cobalt-yeast.

The cobalt content of this yeast is then built up by four successive 3-day fermentations at 25°±1° C. in cornsteep-molasses media containing increasing amounts of cobalt. The composition of these media is the same as that of the above-described medium except that the cobalt content (as $Co(NO_3)_2 \cdot 6H_2O$) of the media in the successive fermentations is 30, 100, 300, and 500 parts per million. As inoculum, 0.5 ml. of the yeast suspension obtained in the immediately preceding fermentation is added to each 25 ml. portion of nutrient medium. Graphically, the process proceeds as follows:

| Fermentation No. | Co content in nutrient medium (p. p. m.) | Inoculum, yeast suspension from fermentation No. |
| --- | --- | --- |
| I | 10 | |
| II | 30 | I |
| III | 100 | II |
| IV | 300 | III |
| V | 500 | IV |

After the final fermentation, the contents of the flasks are centrifuged, the solids resuspended in an equal volume of water, again centrifuged and resuspended. Approximately 3.5 mg. of the yeast (dry weight) per milliliter of medium are thus produced, the yeast containing about 30,000 parts per million of organically-bound cobalt, as determined by spectrographic analysis.

(b) *Preparation of cobalamines and antibiotic (streptomycin) using high-cobalt yeast*

A basal medium is prepared consisting of:
Soybean meal _____ 30 g.
Glucose _____ 20 g.
High-cobalt yeast [as obtained in (a)]. 3 mg. (cobalt concentration— 0.1 mg./l.).
Water to make 1 liter.

Then, 100 ml. aliquots of this medium are placed in 500 ml. Erlenmeyer flasks, which are plugged with nonabsorbent cotton and autoclaved. After cooling to room temperature, each flask is inoculated with 5 ml. of a suspension of *Streptomyces griseous*. By means of a reciprocating shaker as used in (a), the contents of the flasks are mechanically agitated. The temperature is maintained at 25°±1° C. throughout the fermentation process. After 4 days' incubation, the cobalamine production is determined by *Lactobacillus leichmannii* (aseptic assay). The medium contains about 0.71 gamma/ml. of cobalamines. After the fermentation has proceeded for 2 additional days, the cobalamine content is increased to about 1.55 gamma/ml. Streptomycin production after the 4 and 6 day periods is about 1098 and 1497 units/ml., respectively.

[For comparison, the process of Example 1b was carried out substituting a comparable amount of

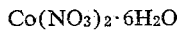

$Co(NO_3)_2 \cdot 6H_2O$ (Co concentration—0.1 mg./l.) for the 3 mg. of high-cobalt yeast of the reference example. Cobalamine determinations made after the process had been carried out for 4 and 6 days showed 0.21 and 0.31 gamma/ml., respectively. Streptomycin production after the 4 and 6 day periods was 1135 and 1571 units/ml., respectively.]

EXAMPLE 2

*Preparation of cobalamines and antibiotic (streptomycin) using high-cobalt yeast*

The procedure of Example 1b is followed except that 15 mg. of a high-cobalt yeast, obtained as described in Example 1a, is used in place of the 3 mg. portion of that example, giving a cobalt concentration of about 0.53 mg./l. Cobalamine determinations made after the medium had been incubated for 4 and 6 days showed about 0.68 and about 1.48 gamma/ml., respectively. Streptomycin production after the 4 and 6 day periods was about 1157 and about 1520 units/ml., respectively.

EXAMPLE 3

*Preparation of cobalamines and antibiotic (streptomycin) using high-cobalt yeast*

The procedure of Example 1b is followed except that about 30 mg. of a high-cobalt yeast, obtained as described in Example 1a, is used in place of the 3 mg. portion of that example, giving a cobalt concentration of about 1.05 mg./l. Cobalamine determinations made after the medium had been incubated for 4 and 6 days showed about 0.73 and about 1.51 gamma/ml., respectively. Streptomycin production after the 4 and 6 day periods was about 1095 and about 1610 units/ml., respectively.

[For comparison, the procedure of Example 1b is followed except that about 30 g. of Anheuser-Busch cobalt yeast * is used in place of the high-cobalt yeast of that example, giving a cobalt concentration of about 1.05 mg./l. Cobalamine determinations made after the medium has been incubated for 4 and 6 days show about 0.35 and 0.85 gamma/ml., respectively. Streptomycin production after the 4 and 6 day periods is about 125 and 132 units/ml., respectively.]

The invention may be variously otherwise embodied within the scope of the appended claims.

We claim:
1. A biosynthesis which comprises cultivating a vitamin B-12-producing microorganism in a suitable nutrient medium for the production of vitamin B-12 said nutrient medium containing a devitalized high-cobalt yeast, and recovering vitamin B-12 from the culture.
2. The process of claim 1 in which the high-cobalt yeast contains at least about 20,000 parts per million of organically-bound cobalt.
3. The process of claim 2 in which the vitamin B-12-producing microorganism is a Streptomyces.
4. A biosynthesis which comprises cultivating *Streptomyces griseus* in a suitable nutrieint medium for the production of vitamin B-12, said nutrient medium containing a devitalized high-cobalt yeast containing at least about 20,000 parts per million of organically bound cobalt, and recovering vitamin B-12 from the culture.

References Cited in the file of this patent

UNITED STATES PATENTS

| 2,515,461 | McDaniel | July 18, 1950 |
| 2,595,499 | Wood et al. | May 6, 1952 |

FOREIGN PATENTS

| 10,981 | Great Britain | of 1900 |

OTHER REFERENCES

Levy et al.: Wallerstein Laboratories Communications, vol. 14, No. 44, pp. 43–47.

Skinner et al.: Henrici's Mold, Yeasts, etc., 2nd. ed., 1947, p. 317.

Hendlin: Science, May 19, 1950, vol. 111, pages 541–542.

*A commercial yeast obtained from Anheuser-Busch and found to contain about 3.5 parts per million of organically-bound cobalt.